(No Model.)

F. J. EDWARDS.
BUTTON.

No. 366,467. Patented July 12, 1887.

Witnesses
J. H. Shumway
Fred C. Earle

Frank J. Edwards
Inventor
By Atty
John P. Earle

UNITED STATES PATENT OFFICE.

FRANKLIN J. EDWARDS, OF WATERBURY, CONNECTICUT, ASSIGNOR TO THE SCOVILL MANUFACTURING COMPANY, OF SAME PLACE.

BUTTON.

SPECIFICATION forming part of Letters Patent No. 366,467, dated July 12, 1887.

Application filed December 21, 1885. Serial No. 186,340. (No model.)

*To all whom it may concern:*

Be it known that I, FRANKLIN J. EDWARDS, of Waterbury, in the county of New Haven and State of Connecticut, have invented a new Improvement in Buttons; and I do hereby declare the following, when taken in connection with accompanying drawings and the letters of reference marked thereon, to be a full, clear, and exact description of the same, and which said drawings constitute part of this specification, and represent, in—

Figure 1:
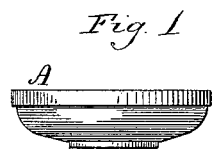
Figure 2:
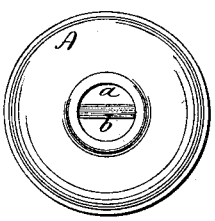
Figure 3:
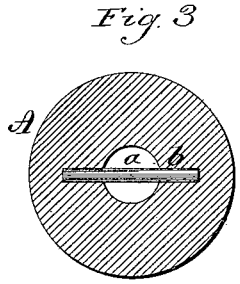
Figure 4:
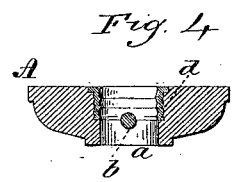

Figure 1, a side view of the button; Fig. 2, a face view showing the outer end of the bushing around the opening; Fig. 3, a horizontal section cutting through in the plane of the bar below the bushing; Fig. 4, a transverse section cutting through the bar at right angles.

This invention relates to an improvement in buttons formed from plastic material, and particularly to such as are constructed with an opening through the center, by which the button is secured, commonly termed "pierced" buttons.

The button is made from any of the known suitable materials, which may be shaped in dies or molds while in a plastic state and then hardened by curing or otherwise.

A represents the body of the button, which may be of any desirable form, constructed with a central opening, *a*, formed in the usual manner by a stud in the mold, around which the material is compressed.

*b* is a piece of wire placed through the stud in the mold, and so that as the material is compressed in the mold the ends will be inclosed and securely held.

Into the opening a metallic bushing, *d*, is inserted during the process of manufacture. This should be placed around the stud, and its outer surface should be serrated or otherwise made irregular, so that the plastic material of the button may unite with the bushing, so as to secure it in place.

The bushing extends through the opening on the face of the button, so as to expose the metal band around the opening, which not only protects the opening in the button, but adds to the finished appearance of the button.

I claim—

The combination of the composition body A, made from plastic material, having a central opening, *a*, a bar, *b*, diametrically across said opening, and a metallic bushing in said opening, the said bushing of irregular shape upon its outer surface and introduced during the process of molding, substantially as described, and whereby the plastic material of the body interlocks with the irregular surface of the bushing.

FRANKLIN J. EDWARDS.

Witnesses:
T. R. HYDE, Jr.,
M. L. SPERRY.